Figure 1:
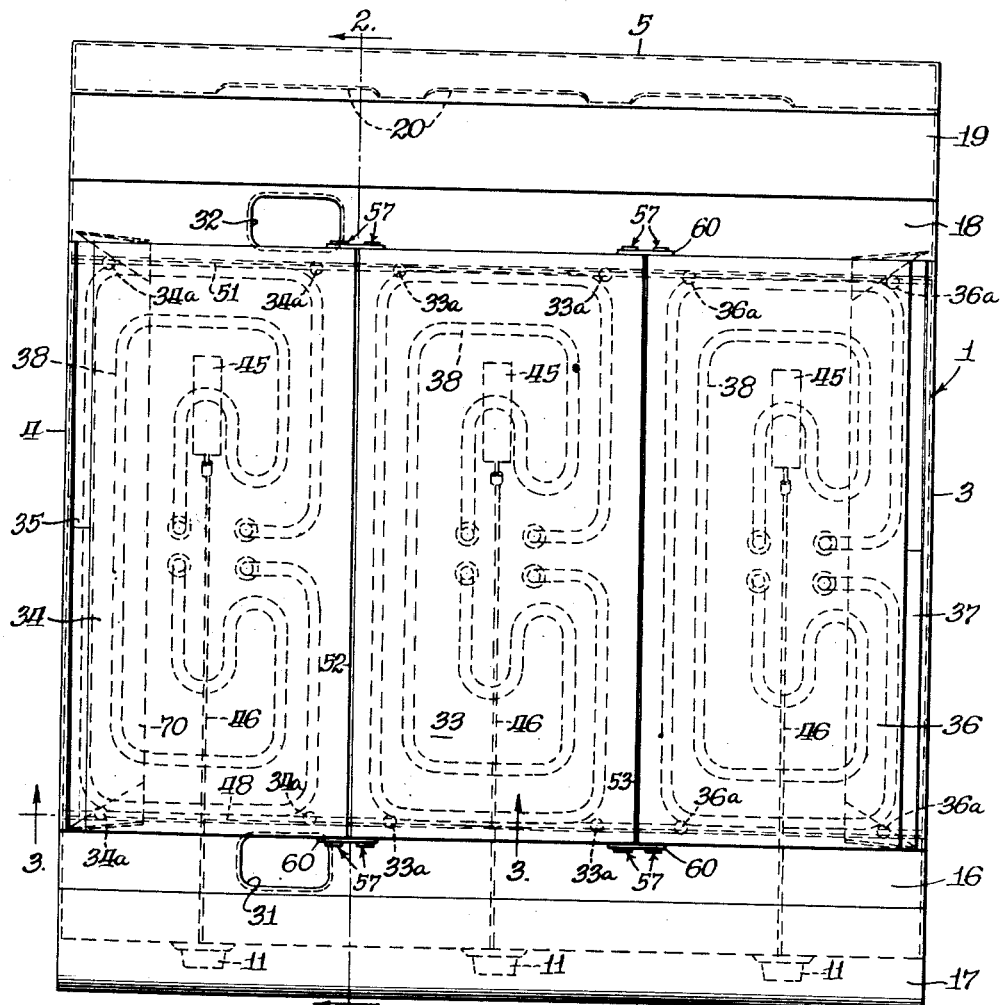

Dec. 7, 1954  H. A. MICHAELIS ET AL  2,696,162
MULTIPLE UNIT COOKING DEVICE
Filed May 19, 1951  3 Sheets-Sheet 1

INVENTORS.
Harold A. Michaelis
BY Edward V. Corff
Andrew B. Hubbard
Atty.

Dec. 7, 1954
H. A. MICHAELIS ET AL
2,696,162
MULTIPLE UNIT COOKING DEVICE
Filed May 19, 1951
3 Sheets-Sheet 2
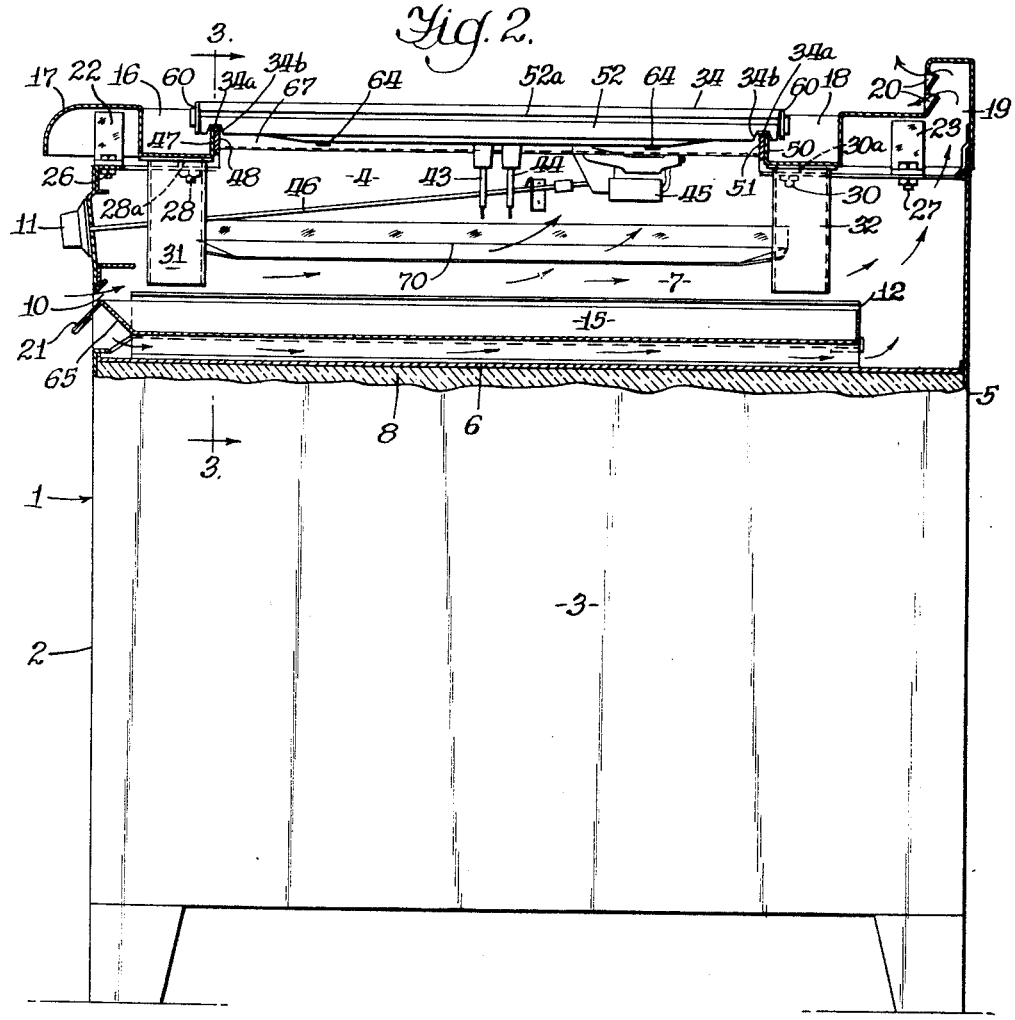
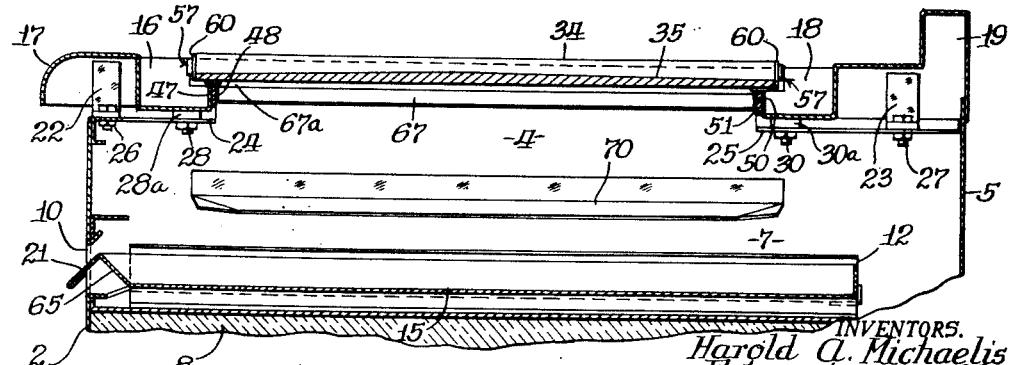
INVENTORS.
Harold A. Michaelis
Edward V. Corff
BY
Andrew J. Hubbard
Atty.

Dec. 7, 1954        H. A. MICHAELIS ET AL        2,696,162
MULTIPLE UNIT COOKING DEVICE
Filed May 19, 1951                          3 Sheets-Sheet 3

INVENTORS.
Harold A. Michaelis
Edward V. Corff
BY
Andrew B. Hubbard
Atty.

United States Patent Office 2,696,162
Patented Dec. 7, 1954

2,696,162

MULTIPLE UNIT COOKING DEVICE

Harold A. Michaelis, Elmhurst, and Edward V. Corff, Berwyn, Ill., assignors to General Electric Company, a corporation of New York Application May 19, 1951, Serial No. 227,212

10 Claims. (Cl. 99—425)

This invention relates to an improved range for use in restaurants, institutions, and other establishments in which food of various types may be prepared throughout the day, and a varied menu requires maximum adaptability of the cooking surface of the range.

It is most desirable that such ranges have a cooking top providing a large griddle area for the preparation of numerous orders of pancakes, ham and eggs and the like during the breakfast rush, and an ample hotplate area for general cooking; and the top should be convertible gradually from a large griddle area to a large hotplate area as griddle orders subside and lunch or dinner food preparation increases. Further, the temperature of a portion of the cooking top should be quickly adjustable so that it may be reduced to the griddling or simmering temperature while the remainder of the top is at 700 to 800 degrees F. for rapid hotplate cooking.

In conventional electric ranges, such as shown in the J. L. Shroyer Patent No. 2,237,795, issued April 8, 1941, for "Electric Range" and the J. L. Shroyer and H. A. Michaelis Patent No. 2,367,626, issued January 16, 1945, for "Cooking Device," the cooking top comprises various combinations of hotplates, griddles, and round fast-heating surface units. Hotplates, as they are known in the trade, are flat cooking surfaces, usually 12" x 24" in dimension, and heated, for example, by heating coils imbedded in or affixed to the underside of the hotplate and controlled by a multi-heat switch providing a range of fixed temperatures suitable for simmering, moderate cooking, and fast cooking. The smooth surface of these conventional hotplates had no grease trough because they were not adaptable for griddle work; it is only recently that thermostats have become available to control the temperature of a hotplate through a range of from 250 to 850 degrees F., which would be required if the hotplate were used for the full range of simmering, griddling, and fast cooking operations. Because there was no grease problem, it was unnecessary to seal the space between adjacent units. Griddles were manufactured in standard sizes of 12" x 24" and 24" x 24" and had cast-in grease troughs at the two sides and across the rear; the grease troughs drained toward a grease catcher at the front. These grease troughs made unusable an approximate 2" strip at the side and rear of the griddle, and in the smaller griddle size, this seriously reduced the usable cooking area. Accurate control of griddle temperatures required the use of thermostats, which in the usual griddle application had a top-control limit of about 500 degrees F. The round high-heat units were ordinarily arranged within a standard 12" x 24" hotplate-like supporting structure; these had individual heating elements controlled by a multi-heat switch. The usual 24" x 36" cooking top of a range, then, might have any combination of these cooking units. However, it will be apparent that a larger hotplate area could be obtained only at the expense of griddle area and vice versa; and conventional ranges did not have the flexibility of operation necessary to meet the varied daily requirements of the usual restaurant.

We have, therefore, directed our attention to improving the flexibility of range cooking top performance, and it is a main object of our invention to provide a range having a plurality of standard size cooking units, all of which may be used as a griddle or as a hotplate, or adjacent units simultaneously used either as a hotplate or griddle.

It is another object of our invention to provide an improved joint which will provide a grease seal between adjacent units comprising the cooking surface of a range, minimize heat transfer from one unit to the other to permit adjacent units to be controlled at widely different temperatures, and maintain said adjacent units in a common plane to permit the smooth use of the spatula and avoid breaks which might interfere with sliding pots and pans from one unit to the other.

It is a further object of our invention to provide an improved means for mounting cooking units on the body structure of a range, to minimize conduction of heat into the range body and reduce the ambient temperature at the electrical components which are ordinarily placed beneath the heating units.

Another object of our invention is to provide an improved means for providing adequate grease drainage from the cooking top without robbing the cooking top of any appreciable amount of usable cooking surface.

Still another object of our invention is to provide a grease-collection system in which grease drainage from the cooking surfaces is collected in a removable pan within the range body, said pan and range body being constructed and arranged to be cooled by air flow above and below the pan, thus keeping the collected grease at a temperature below the smoking point.

It is yet another object of our invention to provide an improved means for preventing grease spillage between the bodies of banked ranges.

It is a still further object of our invention to provide an electric range having a plurality of individually controlled cooking units which are individually or collectively adaptable for varied cooking operations, which are supported relative to the range body in a manner minimizing heat transfer from one to the other of the units or from the units to the range body, and which may readily be removed from the range body for inspection or repair.

Figure 3:
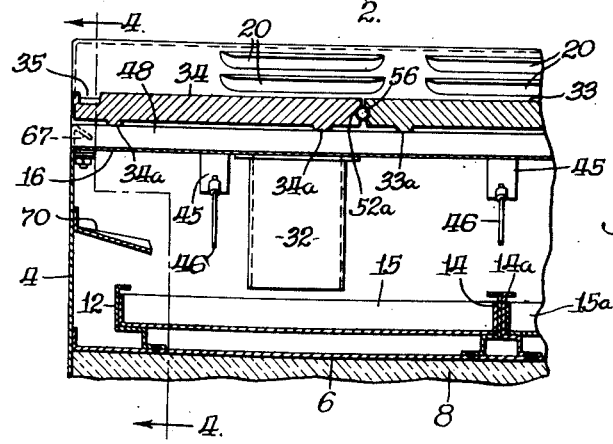
Figure 5:
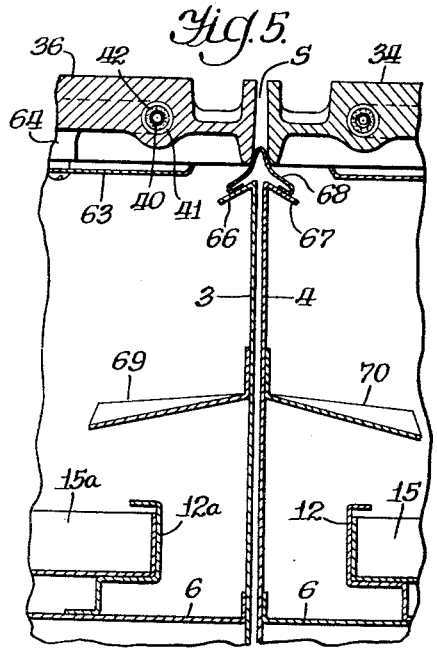
Figure 6:
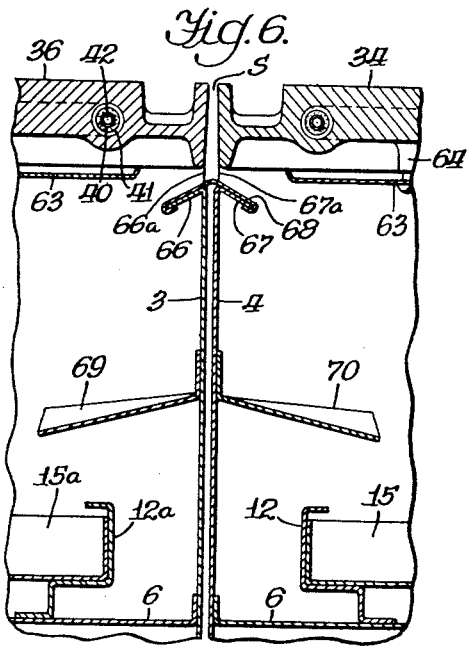
Figure 8:
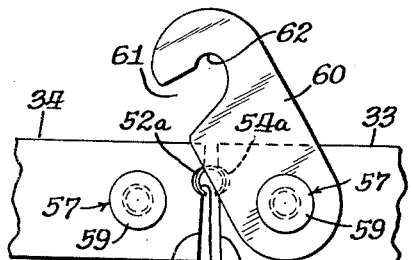
Figure 9:
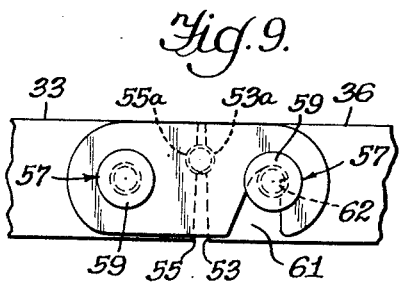
Figures 7, 10:
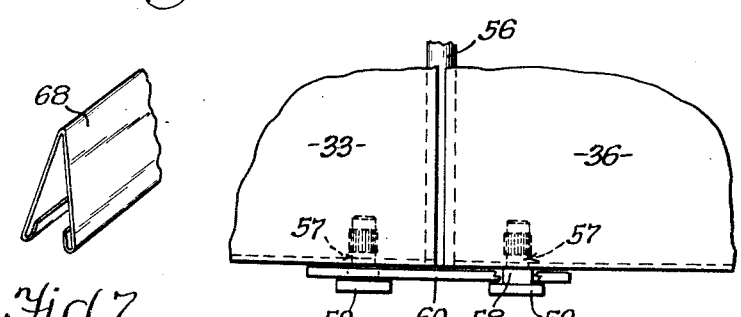

Other features and advantages of our invention will be apparent from the following detailed description of a presently preferred embodiment, read in connection with the accompanying drawings, in which:

Fig. 1 is a plan view of a range embodying our invention; Fig. 2 is a side elevation thereof, in partial vertical section taken on lines 2—2 of Fig. 1; Fig. 3 is a fragmentary front elevation taken along lines 3—3 of Figs. 1 and 2, and looking in the direction thereof; Fig. 4 is a fragmentary side elevation taken on lines 4—4 of Fig. 3; Fig. 5 is a vertical section of portions of adjacent ranges with a banking strip partially in position; Fig. 6 is a view similar to that of Fig. 5, with the banking strip in home position to prevent passage of grease, crumbs, etc. between the side wall plates of the range bodies; Fig. 7 is a perspective of a portion of the banking strip; Fig. 8 is a somewhat schematic end elevation of adjacent cooking units of the range with a grease-guard member in position and the clamp about to be closed; Fig. 9 shows the relative position of the adjacent cooking units after the clamp has been secured; and Fig. 10 is a fragmentary plan view of the adjacent cooking units of Fig. 9.

Referring first to Figs. 1 and 2, a range 1 embodying our invention has a body of suitable structural components including a front panel 2, side panels 3, 4, and a rear panel 5 all suitably reinforced and braced and secured together by welding or other conventional means. A horizontal panel 6 is secured to the front, rear, and side walls to form the floor of a drawer well 7, as later described. It will be understood that the range may have the usual oven, oven door, etc. which have not been shown because they form no part of the present invention. However, it is noted that the panel 6 may comprise an outer shell member of the oven structure and that said structure is insulated by suitable material such as the layer 8 of rock wool or equivalent. The upper portion of the front panel is formed to provide the front opening 10 of the drawer well and immediately above said opening the front panel provides a mounting plate for a row of thermostat adjustment knobs 11. Guide rail structures 12, 14 are suitably secured to the floor panel 6 to slideably support a drawer 15; preferably, there are two such drawers of which the second, 15a, is supported on a guide rail 14a and an outer rail 12a (see Fig. 5) similar to rail 12. These guide rails may be spot-welded to the floor 6, and the adjacent vertical webs of the rail structures 14, 14a spotwelded together for rigidity. The basic range body structure may be considered to include a front grease collector 16 having a forwardly extending apron 17, and a rear grease collector 18 with which is combined a rear vent stack 19 communicating with the drawer well 7 and having any suitable number of louvres 20 which vent the drawer well to the atmosphere. As shown in Figs. 2 and 4, the front panel 21 of drawer 15 is inclined to provide air in-flow passages through which air enters from the room and flows through the drawer well by the draft action of the stack, as later described. It will be understood that the oven is also suitably vented by a separate conduit (not shown) through the stack 19 and that there may be an independent damper-controlled vent (not shown) for the oven, as is well known to those familiar with cooking ranges.

The respective grease collectors extend transversely across the range body at the front and rear thereof and have what might be called a compound channel shape which imparts substantial rigidity to these structures. Therefore, these grease collectors are sufficiently rigid to be capable of supporting distributed loads without visible deflection. We securely fasten the grease collectors to the body structure, as by bolting them securely to flange elements of the body panels, as clearly appears in Figs. 2, 3, and 4. For example, rigid angle members 22 are welded to the inner side walls of the apron portion 17 of collector 16, and similar members 23 are at the rear collector 18. Through these members and flanges 24, 25 of the body panels, pass the bolts 26, 27; studs 28, 30 may be fastened to the bottom wall of the respective collectors 16, 18, and pass through said flanges for securement thereto as shown. Spacers 28a, 30a, support the bottom walls of the grease collectors away from the body structure to reduce heat transfer from the collectors to the body. Thus, we make the respective grease collectors structural components of the range body. Each of the collectors drains into drawer 15 through the respective funnels 31, 32, and it will be understood that the floor of each said collector slopes toward its funnel.

It has previously been noted that cooking ranges of the restaurant type formerly used combinations of hotplates and griddles. In the range described in the aforementioned Shroyer and Michaelis Patent 2,367,626, for example, Fig. 1 thereof shows a range cooking surface in which the center cooking unit was a hotplate, and the two outermost units adjacent thereto were griddles. It is also shown in said patent that each griddle had a grease trough extending along each side margin and across the rear; said troughs drained toward the front to empty into a grease collector similar to the collector 16 of the present invention. The hotplate had no grease trough and there was an open space between the side walls of the hotplate and the adjacent walls of the griddles. This space was to interrupt heat flow from the hotplate to either of the griddles. It was not considered necessary to guard against grease spillage between the hotplate and the griddles because the hotplate was intended primarily for heating cooking pots and the like. It will be evident that the large griddle area of said range was achieved only at a sacrifice of hotplate area, and further, that the effective cooking area of each griddle section was reduced in substantial proportion by the grease troughs thereof.

In the illustrated embodiment of the present invention, we provide a cooking surface which may be used entirely as a hotplate, entirely as a griddle, or—in multiples of one-third—partially as a hotplate and as a griddle. Because the components of our cooking surface are neither hotplates nor griddles in the commonly accepted definition, we shall refer to them merely as "cooking units." Each such cooking unit comprises a rectangular body of structurally strong heat-conducting material, such as cast iron, the upper surface of which is preferably ground and polished. The upper surface of the central unit 33 is smooth throughout; the lefthand unit 34 has along its outermost margin a grease trough 35 which slopes toward each grease collector from an intermediate divide, see Fig. 4; and the righthand unit 36 has along its outermost margin a similar grease trough 37 which also drains to each grease collector. The units 34 and 36 are identical and interchangeable; one unit may be used in the other's location merely by turning it end for end. The cooking units are individually heated and individually controlled.

Cast within the body of each unit—or if preferred secured to the bottom thereof—are one or more heating elements 38 shown in dotted line in Fig. 1 and in cross section in Figs. 5 and 6. Although these heating elements may be of any suitable type, they are preferably of the sheathed-conductor type, such as described and claimed in U. S. patent to C. C. Abbott No. 1,367,341 dated February 1, 1921. Briefly, these heating units comprise a resistance conductor 40 (Fig. 5) mounted in a metallic sheath 41 and maintained in spaced insulated relationship thereto by a compacted mass 42 of heat-conducting and electrically insulating material, such as magnesium oxide. Terminal sections 43, 44 depend from the respective cooking units and by suitable leads, not shown, the heating elements of each unit are connected to a suitable electric circuit through a thermostat 45 fastened to the underside of each cooking unit to be responsive to the temperature thereof. As is well known, ranges of this type are conventionally furnished for 208 v., 230 v., or 440 v., single or three-phase current. Each thermostat is desirably of the type described and claimed in the application of Nicholas Miller, Serial No. 213,740, filed March 3, 1951, entitled "High Temperature Bimetal Thermostat," now U. S. Patent No. 2,644,874, granted July 7, 1953, and assigned to our present assignee. This thermostat is unique in that although of exceptionally rugged construction and relative simplicity, it is capable of control with adequate accuracy over an operating range of from approximately 200 degrees F. to 900 degrees F. The thermostat also provides an off-point, and it therefore functions as an on-off switch in addition to temperature control. A shaft 46 extends between the thermostat and its adjustment knob 11 so that control of the temperature of each unit is at hand at the front thereof. Thus, it will be understood that the control panel portion of the front wall of the range will have three thermostat knobs 11, each being individual to a particular thermostat 45 and cooking unit section.

We support the respective units out of direct contact with the body structure of the range so as to minimize heat transfer thereto, and in this regard, we use to advantage the structurally rigid grease collectors. As shown in Figs. 2 and 3, for example, we reinforce the transverse vertical wall 47 of grease collector 16 by welding thereto a relatively heavy plate 48; and we similarly weld to the transverse vertical wall 50 on grease collector 18, a relatively heavy plate 51. Each said plate is co-extensive with its associated grease collector wall. On the underside of each heating unit near side margins thereof, we form bosses 33a, 34a, and 36a. These bosses are at the front and rear of each unit and support the units on the upper edge of the reinforced grease collector walls. It will be understood that the respective bosses are ground or otherwise machined to maintain the upper surfaces of the respective units in co-planar relation. Adjacent each said boss the respective units have downwardly extending wall formations providing notches, such as 34b Fig. 2, engageable with the grease collector walls 47 and 50 and their associated plates 48, 51 to prevent displacement of the cooking units in a direction perpendicular to the said walls. The front and rear edges of all of the cooking units overhang the grease collectors. As later explained, it is desirable to permit a moderate amount of movement of the units along the said walls.

Because each cooking unit may be individually controlled over a wide temperature range, it is essential to restrict heat flow from one to the other so that if unit 33 had a hotplate temperature of about 700 degrees F., unit 34 was at a griddling temperature of about 350 degrees F., and unit 36 was at a simmering temperature of about 250 degrees F., the elevated temperature of the central unit would not objectionably affect the temperature control of the adjacent units. Also, because any one or all of said units may be used as a griddle, it is advantageous to keep grease from dripping between adjacent units; particularly since the righthand drawer 15a may be used as a hot food storage drawer during rush periods. We accomplish each of these objectives by using a spring metal filler strip between unit 33 and its adjacent units 34, and 36. In a specific preferred form, we form in the inner side wall 52 of unit 34 and the inner side wall 53 of unit 36, an arcuate groove, such as 52a of unit 34, Fig. 8, and 53a, Fig. 9. Similarly, we form the respective side walls 54 and 55 of the central unit 33 with complementary grooves 54a and 55a. The grooves are co-extensive with the respective units and are of identical size and disposition. In cooperation with these grooves we employ a tubular spring member 56, preferably formed from thin stainless steel strip and co-extensive with the grooves. At the front and rear of units 34 and 36, equally spaced from their respective side walls 52 and 53, there are identical shouldered studs 57 which may be driven into holes provided therefor in the said units. Similarly, plate 33 has similar studs at the front and rear, accurately located adjacent its respective side walls 54 and 55. As shown in Fig. 10, the respective studs have a neck portion 58 and a flat head 59; and as is apparent from Figs. 8 and 9, any stud may function either as a pivot or as a keeper for a flat, plate-like, hook or clamp 60, which is used at the front and rear of the units to detachably secure together the adjacent units. The plate-like clamps may be rotated end for end so that they may face in either direction, as is evident from Figs. 8 and 9. This makes it possible, if desired, to pivotally attach all clamps to the central unit 33, or to the outer units. Each clamp 60 has a notch having a relatively wide mouth 61, and a detent portion 62 which has a radius similar to that of the stud necks 58.

The symmetrical positioning of the studs with respect to the side margins of the heating units makes it possible to standardize on two sizes of cooking units. Any one of the units may be turned end for end and yet interconnected with its adjacent unit; and the two units 34 and 36 could, if desired, be placed together, with the remainder of the cooking surface of the range completed by a fast-heat hotplate as previously noted.

Assuming now that the respective heating units have been placed on the supporting walls of the grease collectors 16 and 18, and the electrical connections have been made, the adjacent units are slightly separated and the respective hooks 60 raised to expose fully the ends of the grooves in the said units. Then, a tubular member 56 is slid into the grooves for the full length thereof. The axial slot of the member 56 faces down as shown in Fig. 3. In its relaxed form, the spring member 56 will contact the grooves only along edge portions thereof. Then, the clamp member 60 at each end of the units is swung down so that the wide mouth 61 lies over the necks 58 of the studs, whereupon the front and rear clamps are driven home into the Fig. 9 position. In such position, the clamps draw the units toward each other and put the spring members 56 under compression. Said members then conform to the configuration of adjacent slots. A slight reaction of the spring members separates the adjacent units slightly so that the necks 58 enter the clamp detent portions 62.

It will be obvious that the spring members 56 form a grease-impervious seal between adjacent units. Any grease which may accumulate in the spaces above said members will dribble into the grease collectors, and any food particles, crumbs, etc. which may drop into these spaces may be readily removed by drawing a thin cleaning tool along said space. The grease-guard members 56 maintain the co-planar relation of adjacent units, permitting the full use of a smoothing spatula to scrape the units clean. There are no steps or offsets which will interfere with sliding a cooking vessel across the cooking top.

Perhaps more importantly, however, the spring members 56 provide a grease guard which minimizes heat flow from one to the other of the adjacent cooking units. The spring members are of light gauge material, such as stainless steel strip of .018" thickness; and although in contact with the adjacent units over a substantial area to provide an adequate grease seal, they restrict heat transfer from one unit to another to a thin top wall portion. As clearly appears in Fig. 9, the bottom edges of the spring member do not meet even when a latch 60 has drawn the adjacent units into home position. Therefore, although the stainless steel spring member may have good heat conductivity in the broad sense, its thin wall section gives it what might be termed a low thermal capacity or conductivity in the sense of actual heat transfer from one unit to the other. It will be noted from Figs. 2, 6, and 10 that the front, rear, and side walls of the cooking units slope inwardly toward the bottom. At the front and rear walls such slope reduces the area of contact of the clamps 60 therewith and thus minimizes heat transfer along said clamps. For these reasons we are able to maintain adjacent cooking units at rather widely separated temperature levels; the marginal areas of a low temperature cooking unit are not influenced to any practical extent by a higher temperature of the immediately adjacent unit.

It has been noted that the spacers 28a, 30a reduce direct heat flow from the cooking units to the body structure. As a further means for preventing excessive body temperatures, we shield the drawer well from direct radiation from the cooking units, and as indicated in Figs. 5 and 6, fasten a suitable reflector 63 beneath the units. These reflectors, which are not shown in the other figures to avoid obscuring structural details, are substantially co-extensive with the heating units and are removably affixed thereto as by screws entering tapped holes in suitably placed bosses 64 provided on the units.

It has previously been noted that the front panel 21 of the drawer slopes forwardly to provide air in-flow openings above and below the drawer. This appears to advantage in Fig. 2, in which it will be noted that a downwardly and rearwardly sloping portion 65 of the drawer front deflects air downwardly beneath the drawer, whereas the panel 21 directs air above the drawer and into the drawer well. The heated cooking units will increase the air temperature within the well and induce air flow toward the rear under the draft action of stack 19. Such air movement plus the shielding effect of the baffles 63, holds the temperature of drawer 15 below the smoking temperature of grease which might be present therein; and with respect to the hot-food storage drawer 15a, maintains it at a temperature which will not dry out the food which it may contain.

It is obvious that in large restaurants more than one range will be required, and it is the practice to line up or "bank" the ranges in a continuous row. Uneven floor surfaces or other practical considerations make it undesirable or impracticable to bolt or otherwise secure adjacent ranges to each other; nor ordinarily may a grease barrier, such as the tubular spring member 56, be employed between the adjacent cooking units of banked ranges to form a grease guard between the respective ranges. Yet, it is desirable to provide means for preventing the spillage of liquids between the side panels of adjacent ranges and to prevent crumbs or food particles from dropping therein. Pursuant to one aspect of our invention, we provide easily applied means for accommodating such spillage. Side panels 3 and 4 of our range are formed at their upper margins with the downwardly extending flanges 66, 67 which extend between the respective grease collectors as shown in Fig. 4. There is a rather narrow slot-like opening above the peak of each flange and the bottom of the outermost cooking unit, as indicated by 66a and 67a, Fig. 6. When the ranges are banked, the respective flanges 66, 67 come into reasonably close alignment, and we employ in association therewith a resilient banking strip 68 co-extensive with the flanges and arranged to snap over the edges thereof to form a continuous deflector.

The banking strip is preferably of light gauge springable material, such as stainless steel, and when it is relaxed, as shown in Fig. 7, its side walls form an angle much more acute than that created by the adjacent flanges 66, 67. It will be noted also that the bottom edges of the banking strip have a hook-like formation to grip the edges of said flanges, as appears in Fig. 6.

When the adjacent ranges are positioned, the space S between their cooking units is temporarily enlarged by taking advantage of the lateral play of the cooking units on their respective transverse wall supports. Then the banking strip is squeezed together for insertion into the space and pushed downwardly by a knife blade or other tool until its bottom edges engage the sloping flanges 66, 67 which cause the strip to spread as shown in Fig. 5. Ultimately, the banking strip will snap over the edges of the flanges into the home position of Fig. 6. The cooking units may then be returned to close the gap S to the minimum width permitted by actual installation conditions. The flexibility of the banking strip permits it to distort or twist to accommodate itself to any misalignment of the flanges 66 and 67 which may result from an uneven floor surface, and the depth of the leg portions of the banking strip is so related to the spacing between the bottom edge of the cooking units and the top of said flanges that the side walls of the adjacent units maintain control over the banking strip until it reaches its home position.

Because of the spacing between the sides of the drawers and the side panels of the range, it is impractical to have the flanges 66 and 67 of such length as to overhang the edges of the drawers. Accordingly, we employ supplemental deflectors as 69 and 70 which overhang the drawers by a substantial margin, and of course, catch and deflect into the drawers any spillage from the banking strip.

While there has been described what is at present considered to be the preferred embodiment of the invention, it will be understood that various modifications may be made therein, and it is intended to cover in the appended claims all such modifications as fall within the true spirit and scope of the invention.

We claim:

1. In a multiple-unit cooking device, a substantially rectangular body structure, relatively narrow, rigid, wall means extending along opposite sides of said structure, a rigid cooking top comprising a plurality of rigid, plane-surfaced cooking units bridging said wall means, means for individually heating said cooking units to a desired temperature and a tubular spring metal grease-guard member of substantially circular cross-sectional shape interposed between adjacent units below the surface of said cooking units and in continuous intimate engagement with the side walls thereof, said members being coextensive with said units and having an imperforate upper wall.

2. In a cooking range and the like, a body structure, rigid wall means securely supported therein and extending transversely of said structure respectively adjacent the front and rear portions thereof, said wall means having relatively narrow upper edge portions, a plurality of plane-surfaced cooking units extending between said wall structures and being supported thereon at a plurality of spaced points along the length thereof to establish a coplanar relationship of the upper surfaces of said units, adjacent marginal walls of said units being in close, uniformly spaced, relationship throughout, a resilient, tubular spring metal filler strip of low thermal capacity interposed between said adjacent units below the surface thereof with an imperforate wall of said filler strip cooperating with marginal walls of the adjacent cooking units to provide an open ended channel, clamping means for drawing said adjacent units toward each other to place the filler strip under compression, and means for individually heating said units to a desired cooking temperature.

3. In a cooking range or the like, a body structure, a transversely extending grease collector secured to said structure at the front and rear thereof, a common vertical transversely extending wall of each collector being structurally rigid, a plurality of cooking units extending between said grease troughs, said units being supported on said rigid walls by relatively widely spaced elements of small individual area, whereby the heat transfer area between said units and said walls is low, the ends of said units overhanging the respective grease collectors, adjacent marginal walls of said units being in close, uniformly spaced relation throughout the length thereof, a resilient filler member of low heat capacity interposed between said walls, and means at the front and rear portions of said units to mechanically interconnect the same while subjecting said filler member to compressive stress for maintaining said member in tight contact with said adjacent walls.

4. In a cooking range or the like, a body structure, elongate grease collectors secured thereto at front and rear portions thereof and extending transversely of said body, a marginal vertical transverse wall of each said collector being structurally reinforced, a plurality of rectangular plane-surfaced cooking units extending between and supported on said reinforced walls with opposite end portions of said units overhanging the respective grease collectors, said units being in relatively close spaced relationship and having complementary, relatively shallow, grooves in adjacent side walls, said grooves extending substantially the full length of the units, a tubular spring metal filler strip having side walls conforming to the shape of said grooves slidably insertable into said grooves to provide a grease-impervious barrier between said adjacent units, and means for drawing said adjacent units toward each other to cause said filler strip to be tightly in engagement with said unit side walls.

5. A cooking range according to claim 4 in which the outermost edge portions of the outermost cooking units have a grease trough draining toward each said grease collector.

6. In a cooking range or the like, a body structure having transversely extending grease collectors secured to said structure near the front and rear walls thereof, a vertical transverse wall of each collector being structurally rigid, a plurality of rigid cooking units extending between said walls and supported thereby out of direct contact with said body structure, means for draining grease from said cooking units into said collectors, resilient grease-impervious means of low thermal conductivity supported between adjacent units below the surface thereof, an open-topped drawer well in said body structure below said cooking units, said well having a floor plate, means in said well providing spaced drawer rails disposed above said plate, a vent stack communicating between said drawer well and the outer atmosphere, a drawer in said well slidably mounted on said drawer rails, said drawer having a width greater than the width of the cooking unit and having an inwardly sloping front panel arranged to admit room air from the front of the range over and beneath said drawer, whereby the draft action of the vent stack will induce air movement above and below said drawer to reduce the temperature of the drawer and the immediately surrounding space, and means for draining said grease collectors continuously into said drawer.

7. In a cooking installation comprising two ranges adapted to be placed in relatively closely spaced side-by-side relationship, each said range having a body structure including a side wall panel; a cooking unit supported on each body structure, a side wall of each unit being substantially in vertical alignment with said side wall panel whereupon said units are spaced one from the other; a drawer-like structure within each body structure adjacent said side wall, and a drip plate fixed to the respective side walls and overhanging the respective drawers; means for preventing the passage of grease or other foreign matter into the space between said panels, comprising flange members extending inwardly and downwardly along the upper edges of said side panels, the upper edge of each flange being spaced from the lower edge of said cooking units and overlying said drip plates, and a cover strip of spring metal of inverted V-shape adapted to be inserted through the opening between the adjacent cooking units and driven downwardly to engage the respective flange members, the apex angle of said cover strip when relaxed being more acute than the apex angle formed by the adjacent flange members and the lower edges of said strip being turned upwardly and inwardly to provide a rounded-edge hook-like formation engageable over the free edges of said flange members to secure said strip thereon, said strip thereupon providing a continuous cover for the gap between adjacent side wall panels to deflect into said drip plates any foreign matter which may drop through the opening between said cooking units.

8. A grease-guard structure according to claim 7 in which the length of the side wall portions of the spring metal cover strip is greater than the distance between the bottom of the cooking units and the surface of the flange members, whereupon the side portions of the metal strip are spread nearly into final engagement with the flange members before the apex of the metal strip passes below the bottom edges of said cooking units.

9. A cooking range or the like, comprising a body structure, a plurality of substantially plane-surfaced cooking units supported thereon, means for establishing said units individually at a preselected temperature over a range of the order of from 250 degrees to 850 degrees F., means for securing adjacent cooking units together in coplanar relation to achieve a substantially continuous cooking surface of large useful area, and a thin metal strip of low heat transmitting capacity interposed between adjacent units below the cooking surface thereof to prevent material from dropping through the space between adjacent units while minimizing heat transfer between said units, said metal strips being held by said securing means in tight engagement with the side walls of adjacent units.

10. A cooking range, comprising a body structure having coplanar, rigid, vertical walls disposed in mutually parallel relation, one of said walls extending across a front portion of the body structure and the other extending across a rear portion thereof, a plurality of flat, smooth-topped cooking units extending between said walls, means including a plurality of support members interposed between said cooking units and said walls to support said units thereon with their upper surfaces in spaced, side-by-side co-planar relation to form a cooking surface of large useful area; means for individually heating said cooking units at selected temperatures over a range of the order of from 250 to 850 degrees F.; and means for closing the space between adjacent cooking units while minimizing heat transfer therebetween, comprising a resilient filler member of low heat transfer capacity disposed between adjacent units and extending substantially coextensive therewith, means for supporting said filler member below the cooking surface of said units; and means extending between adjacent units to releasably interconnect the same while subjecting said filler member to compressive stress to maintain it in said supported position and in snug contact with the sidewall of its adjacent units.

References Cited in the file of this patent

UNITED STATES PATENTS

| Number | Name | Date |
|---|---|---|
| 316,741 | Carpenter | Apr. 28, 1885 |
| 1,107,987 | Nash | Aug. 18, 1914 |
| 1,253,216 | Day | Jan. 15, 1918 |
| 1,902,111 | Vaughn | Mar. 21, 1933 |
| 2,237,795 | Shroyer | Apr. 8, 1941 |
| 2,304,140 | Bergholm | Dec. 8, 1942 |
| 2,362,757 | Lang | Nov. 14, 1944 |
| 2,367,626 | Shroyer et al. | Jan. 16, 1945 |
| 2,370,863 | Jones | Mar. 6, 1945 |